(12) United States Patent
McDowell et al.

(10) Patent No.: US 11,097,798 B1
(45) Date of Patent: Aug. 24, 2021

(54) DISPLAY FIXTURE WITH ADJUSTABLE WHEEL RETENTION WEDGE

(71) Applicant: TARGET BRANDS, INC., Minneapolis, MN (US)

(72) Inventors: Daniel McDowell, Minneapolis, MN (US); Jeremy A. Clark, Minneapolis, MN (US); Scott E. Denby, Minneapolis, MN (US); Andrew J. Liesveld, Omaha, NE (US); Marian H. Locke, Parker, CO (US); Christopher P. Doepke, Spring Branch, TX (US); Mark A. Campbell, Middlebury, IN (US); Douglas J. Burman, Oak Grove, MN (US); Matthew D. Purrington, Cottage Grove, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 0 days.

(21) Appl. No.: 16/945,245

(22) Filed: Jul. 31, 2020

(51) Int. Cl.
  *B62H 3/08* (2006.01)
  *A47F 7/04* (2006.01)
  *A47F 10/04* (2006.01)

(52) U.S. Cl.
  CPC ............ *B62H 3/08* (2013.01); *A47F 7/04* (2013.01); *A47F 10/04* (2013.01)

(58) Field of Classification Search
  CPC ...... B62H 3/08; B62H 3/00; B62H 2003/005; B62H 5/14; A47F 2003/066; A47F 10/04; A47F 10/045; A47F 5/08; A47F 7/04; A47B 53/00; B60R 9/04; B60R 11/00

USPC ............ 211/17, 20, 151, 162; 188/32, 19; 186/34, 46; 248/503, 503.1, 510; 16/100, 96 R; 224/310, 324, 326, 924

See application file for complete search history.

(56) References Cited

U.S. PATENT DOCUMENTS

| 770,510 A | 9/1904 | Stullken |
| 947,068 A | 1/1910 | Weiske |
| 1,617,369 A * | 2/1927 | Blakely .................. B60P 3/077 410/30 |

(Continued)

OTHER PUBLICATIONS

McDowell, Daniel. U.S. Appl. No. 16/945,251, filed Jul. 31, 2020 (29 pages).

(Continued)

*Primary Examiner* — Jennifer E. Novosad
(74) *Attorney, Agent, or Firm* — JoAnn M. Seaton; Griffiths & Seaton PLLC

(57) ABSTRACT

A platform fixture for displaying a wheeled good includes a frame, a rail, a wedge stop, and a mounting bracket. The rail extends across a top of the frame. The wedge stop is configured to selectively receive one or more wheels of the wheeled good and includes longitudinal flanges and two coupling flanges. Each of the two longitudinal flanges extends downwardly from a V-shaped top surface of the wedge stop. Each of the two coupling flanges extends inwardly from a different one of the longitudinal flanges. The mounting bracket is coupled to the rail and includes two T-shaped side segments defining a base portion and a cross bar that is wider than the base portion. Each of the two coupling flanges includes a cutout. The wedge stop is coupled to the mounting bracket by placing each base portion within the cutout of a different one of the two coupling flanges.

20 Claims, 11 Drawing Sheets

(56) References Cited

U.S. PATENT DOCUMENTS

| | | | |
|---|---|---|---|
| 1,915,320 A | 6/1933 | Jones | |
| 2,465,551 A * | 3/1949 | Otterness | B60T 3/00 188/32 |
| 2,533,981 A | 12/1950 | Weaver | |
| 2,569,858 A | 10/1951 | Kirtner et al. | |
| 3,171,632 A | 3/1965 | Jines | |
| 3,201,078 A * | 8/1965 | Grandjean | H01J 19/64 248/510 |
| 3,762,569 A | 10/1973 | Spring | |
| 3,861,533 A | 1/1975 | Radek | |
| 3,865,244 A | 2/1975 | Galen et al. | |
| 3,883,002 A | 5/1975 | Moore | |
| 3,912,139 A | 10/1975 | Bowman | |
| 3,923,354 A * | 12/1975 | Young | A47B 53/02 312/201 |
| 3,941,406 A * | 3/1976 | Eggleston | B60P 3/07 410/3 |
| 4,189,274 A | 2/1980 | Shaffer | |
| 4,190,166 A * | 2/1980 | Allsop | A47F 7/0028 211/162 |
| 4,191,391 A * | 3/1980 | Dorlini | B62B 13/18 280/11 |
| 4,265,383 A * | 5/1981 | Ferguson | B60R 9/04 224/326 |
| 4,343,419 A * | 8/1982 | Mareydt | B60R 9/04 224/326 |
| 4,442,961 A * | 4/1984 | Bott | B60R 9/10 211/20 |
| 4,768,692 A * | 9/1988 | Schneider | B60R 9/04 224/326 |
| 4,898,283 A * | 2/1990 | Kingsford | A47F 5/0093 211/162 |
| 4,901,902 A * | 2/1990 | Stapleton | B60R 9/04 224/326 |
| 4,911,507 A * | 3/1990 | Leist | A47B 53/02 312/201 |
| 4,957,264 A * | 9/1990 | Hakanen | B60R 11/02 248/510 |
| 4,984,737 A * | 1/1991 | Muth | A47B 53/02 105/170 |
| 5,046,652 A * | 9/1991 | Shanok | E05B 1/0015 224/326 |
| 5,086,930 A | 2/1992 | Saeks | |
| D328,588 S | 8/1992 | Mitchell | |
| 5,143,267 A * | 9/1992 | Cucheran | B60R 9/00 224/321 |
| 5,205,627 A * | 4/1993 | Davison | A47B 53/02 312/198 |
| 5,275,319 A | 1/1994 | Ruana | |
| 5,292,009 A | 3/1994 | Smith | |
| 5,377,886 A | 1/1995 | Sickler | |
| 5,462,398 A | 10/1995 | Hymer | |
| 5,476,200 A | 12/1995 | Wong | |
| 5,497,927 A | 3/1996 | Peterson | |
| 5,520,316 A | 5/1996 | Chen | |
| 5,549,231 A | 8/1996 | Fletcher et al. | |
| 5,553,761 A * | 9/1996 | Audoire | B60R 9/045 224/321 |
| 5,560,498 A * | 10/1996 | Porter | B60R 9/10 211/20 |
| 5,562,215 A * | 10/1996 | Blakey | B62H 1/02 211/17 |
| D378,615 S | 3/1997 | Neviaser et al. | |
| 5,690,259 A | 11/1997 | Montani | |
| 5,702,007 A * | 12/1997 | Fritz | B62H 3/08 211/17 |
| 5,820,002 A | 10/1998 | Allen | |
| D414,455 S | 9/1999 | Perry | |
| 5,975,391 A * | 11/1999 | Aftanas | B60R 9/04 224/309 |
| 5,988,403 A | 11/1999 | Robideau | |
| 6,062,396 A * | 5/2000 | Eason | A47F 7/04 211/20 |
| 6,158,601 A * | 12/2000 | Baker | A47B 53/00 211/162 |
| 6,244,483 B1 | 6/2001 | McLemore et al. | |
| 6,290,029 B1 * | 9/2001 | Gubler | B60T 3/00 188/36 |
| 6,336,562 B1 | 1/2002 | Mori | |
| 6,382,480 B1 | 5/2002 | Egly et al. | |
| 6,386,331 B2 | 5/2002 | Scheffer | |
| 6,394,283 B1 * | 5/2002 | Fletcher | B62H 3/08 211/20 |
| 6,415,970 B1 * | 7/2002 | Kmita | B60R 9/04 224/309 |
| 6,527,154 B2 * | 3/2003 | Larsen | B60R 5/00 224/545 |
| 6,575,310 B2 * | 6/2003 | Chamoun | B66F 7/243 211/22 |
| 6,581,785 B1 * | 6/2003 | Falkenstein | A47F 7/04 211/24 |
| 6,637,840 B2 * | 10/2003 | Zaleski | B62D 55/24 152/187 |
| 6,669,314 B1 * | 12/2003 | Nemec | A47B 53/02 312/201 |
| 6,698,994 B2 | 3/2004 | Barrett | |
| 6,752,303 B2 | 6/2004 | McLemore et al. | |
| 6,761,297 B1 | 7/2004 | Pedrini | |
| 6,840,022 B1 * | 1/2005 | Manogue | A47B 53/00 211/162 |
| 7,014,002 B2 * | 3/2006 | Mizuta | B60R 16/04 180/68.5 |
| 7,168,575 B2 | 1/2007 | Olsen, Jr. | |
| 7,273,197 B1 * | 9/2007 | Huggins | B60T 3/00 188/19 |
| 7,441,679 B1 * | 10/2008 | Harberts | B60R 9/045 224/315 |
| 7,604,131 B1 | 10/2009 | Clark et al. | |
| 7,694,830 B1 | 4/2010 | Larson | |
| 7,784,622 B2 | 8/2010 | Bernard | |
| D625,678 S | 10/2010 | Heinz | |
| 7,815,083 B2 | 10/2010 | Clausen et al. | |
| 7,857,177 B2 | 12/2010 | Reeves et al. | |
| 8,113,398 B2 | 2/2012 | Sautter et al. | |
| 8,496,148 B2 | 7/2013 | Farney | |
| 8,800,786 B2 * | 8/2014 | Parkins | B60R 9/10 211/20 |
| 8,820,004 B1 | 9/2014 | Jeffords | |
| D718,456 S | 11/2014 | McNamee | |
| 9,187,046 B2 | 11/2015 | Peck | |
| 9,187,047 B2 * | 11/2015 | Sautter | B60R 9/045 |
| 9,845,125 B1 | 12/2017 | Liu | |
| 10,392,064 B2 | 8/2019 | Rossiter et al. | |
| 10,433,659 B1 * | 10/2019 | Pedersen | A47F 5/0018 |
| 2002/0053581 A1 * | 5/2002 | Peschmann | B60R 9/10 224/319 |
| 2002/0125279 A1 | 9/2002 | Edgerly et al. | |
| 2003/0089751 A1 | 5/2003 | Munoz et al. | |
| 2003/0132259 A1 | 7/2003 | McLemore et al. | |
| 2003/0178458 A1 * | 9/2003 | Trambley | B60R 9/04 224/326 |
| 2003/0222191 A1 | 12/2003 | Tsai | |
| 2004/0060878 A1 | 4/2004 | Ho | |
| 2004/0124159 A1 | 7/2004 | West | |
| 2004/0256339 A1 * | 12/2004 | Welsch | A47B 53/02 211/162 |
| 2005/0061842 A1 | 3/2005 | Tsai | |
| 2005/0236342 A1 | 10/2005 | Jeong | |
| 2006/0124678 A1 * | 6/2006 | Wooten | B60R 9/045 224/326 |
| 2006/0191858 A1 * | 8/2006 | Posner | A47F 10/04 211/20 |
| 2006/0290154 A1 * | 12/2006 | Stapleton | B60R 9/04 296/3 |
| 2007/0144992 A1 * | 6/2007 | Chen | B65G 1/10 211/162 |
| 2007/0246496 A1 | 10/2007 | Reeves et al. | |
| 2008/0272137 A1 * | 11/2008 | Fitzgerald | G07F 9/10 221/1 |

(56) References Cited

U.S. PATENT DOCUMENTS

2015/0008197 A1   1/2015  Blume
2015/0102076 A1   4/2015  Peck
2019/0381947 A1*  12/2019 Fehr ......................... B60R 9/06

OTHER PUBLICATIONS

"Park Right® Flat-Free Tire Ramps—Set of 4", printed from www.walmart.com/ip/Park-Right-Flat-Free-Tire-Ramps-Set-...xpcnLXE6k2as4Jpl3aAuAxsuSUjTUoAdKOvpO65qUP3ufMZYbsAj-IEALw_wcB, publicly available at least as early as Mar. 26, 2018 (9 pages).

Bicycle Rack from Lozier Product Catalog and Associated Product Drawings. Feb. 16, 2007 (3 pages).

Bicycle Rack from Lozier Product Catalog, 2018 (1 page).

* cited by examiner

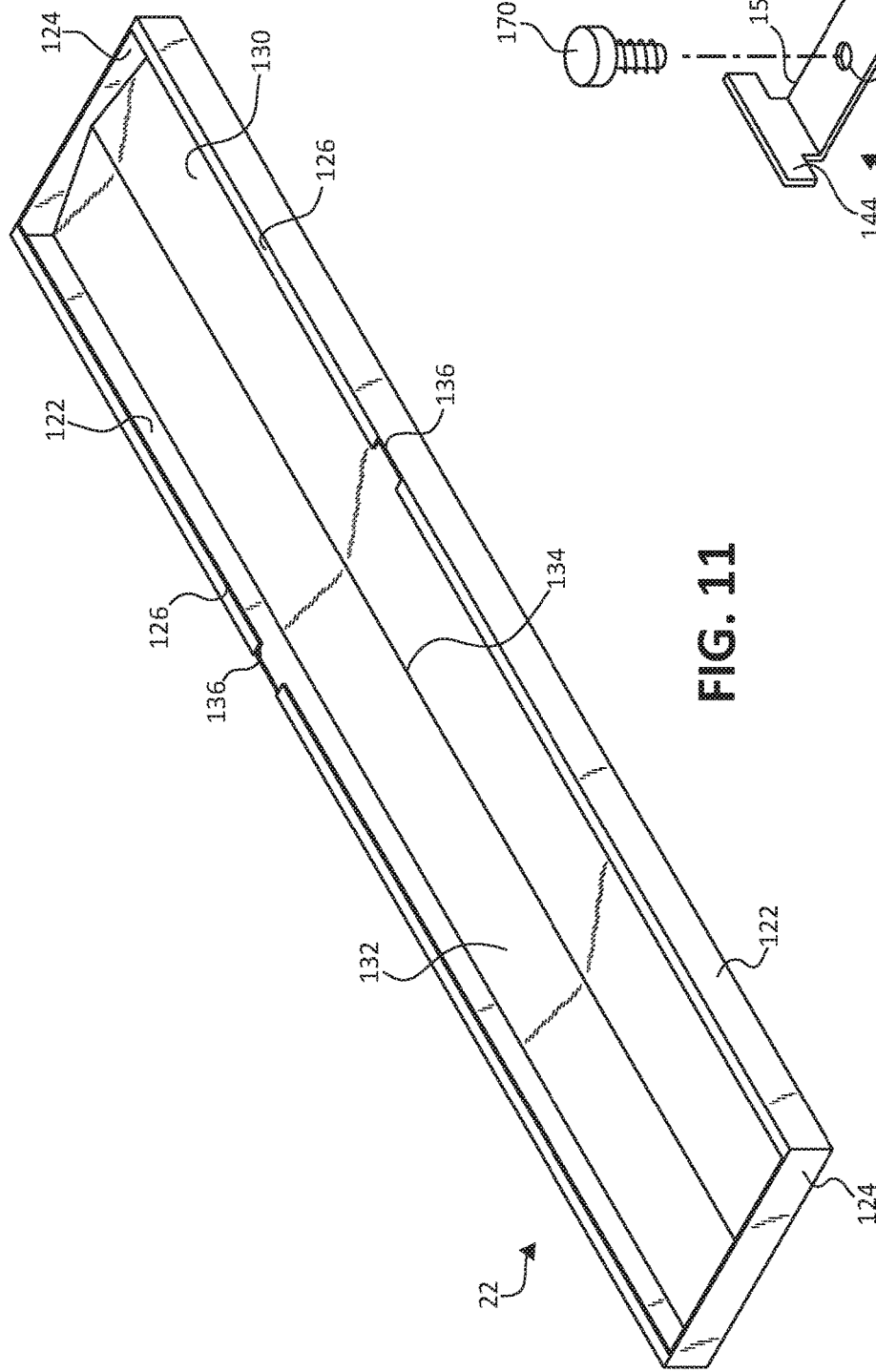
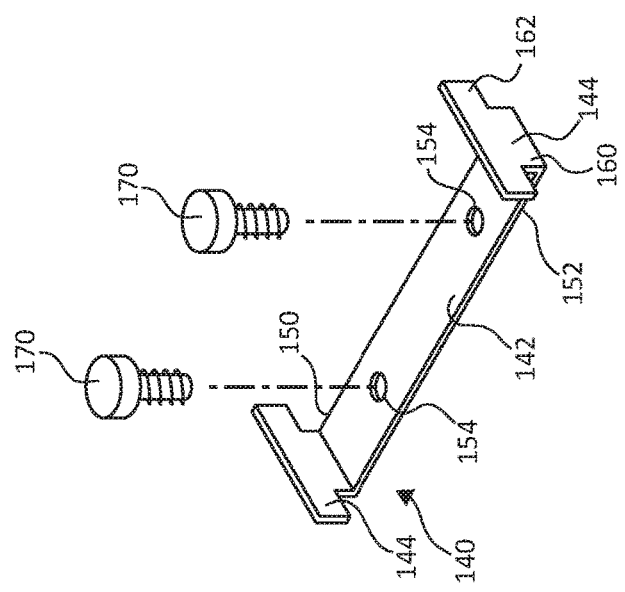
FIG. 11
FIG. 12

US 11,097,798 B1

DISPLAY FIXTURE WITH ADJUSTABLE WHEEL RETENTION WEDGE

BACKGROUND OF THE INVENTION

Small wheeled goods, such as strollers, wagons, bikes, tricycles, etc., often cause issues for storage and transport due to their need to be maintained in a generally upright and balanced position to alleviate space concerns and promote the general well-being of the good. Such storage needs can be further problematic in a retail or similar setting when it is desired to display wheeled goods in an upright position so potential consumers can view each wheeled good in an "in use" position. In general, it is desirable that the means for supporting each wheeled good is visually as unobtrusive as possible so as not to detract from the overall look and features of the wheeled good. At the same time, the means for supporting each wheeled good needs to be sufficiently secure generally preventing the wheeled good from tipping or otherwise falling or from rolling out of a fairly secure position, even while potential consumers touch or otherwise visually interact with the wheeled goods while inspecting the one or more wheeled goods for potential purchase.

SUMMARY

One embodiment of the present invention relates to a platform fixture for displaying a wheeled good including a frame, an elongated rail, a wedge stop, and a mounting bracket. The elongated rail extends across a top of the frame. The wedge stop has a substantially V-shaped top surface configured to selectively receive one or more wheels of the wheeled good and includes two longitudinal flanges and two coupling flanges. Each of the two longitudinal flanges extends downwardly from an opposing side of the V-shaped top surface. Each of the two coupling flanges extends from an edge of a different one of the two longitudinal flanges toward an opposite one of other of the two longitudinal flanges. The mounting bracket is coupled to the elongated rail and includes two side segments spaced from each other and each being substantially T-shaped extending from the elongated segment with a base portion and terminating in a cross bar that is wider than the base portion. Each of the two coupling flanges includes a cutout that is wider than the base portion of the mounting bracket and narrower than the cross bar of the mounting bracket. The wedge stop is coupled to the mounting bracket by placing each base portion of the mounting bracket within the cutout of a different one of the two coupling flanges such that each cross-bar is maintained between the different one of the coupling flanges and the V-shaped top surface to restrain vertical movement of the wedge stop from the elongated rails. Other display fixtures, wheeled goods, related assemblies and associated methods are also described herein.

BRIEF DESCRIPTION OF THE DRAWINGS

Embodiments of the invention will be described with respect to the figures, in which like reference numerals denote like elements, and in which:

FIG. 11 is a top perspective view of a mounting bracket of the display fixture of FIG. 1, according to one embodiment of the present invention.

FIG. 12 is a partial perspective view illustration of the display fixture of FIG. 1, according to one embodiment of the present invention.

DETAILED DESCRIPTION

The following detailed description of the invention provides example embodiments and is not intended to limit the invention or the application and uses of the invention. Furthermore, there is no intention to be bound by any theory presented in the preceding background of the invention or the following detailed description of the invention.

Relational terms herein such a first, second, top, bottom, etc. may be used herein solely to distinguish one entity or action from another without necessarily requiring or implying an actual such relationship or order. In addition, as used herein, the term "about" or "substantially" apply to all numeric values or descriptive terms, respectively, and generally indicate a range of numbers or characteristics that one of skill in the art would consider equivalent to the recited values or terms, that is, having the same function or results.

This innovation provides one or more retention assemblies for supporting wheeled goods, such as strollers, wagons, tricycles, bicycles, carts, walkers, etc. in a retail or other setting in a generally upright or "in-use" position. This position allows potential consumers to evaluate the overall look, other features, and presentation of such features and control therefor while the retention assemblies securely maintains the one or more wheeled good in place on the display. In one embodiment, the retention assembly employs a linear track for receiving a wheel stop for laterally securing the wheeled good in place. The wheel stop is adjustable along, while also being selectively securable in a static position along, a linear rail to accommodate wheeled goods of various sizes. In one embodiment, the retention assembly includes a platform for supporting the wheeled good above a floor support level. One or more substantially vertical divider walls may extend upwardly from the platform to divide the display space into two or more areas. In one example, one divider wall divides the display space into two areas, one for supporting and maintaining fully assembled wheeled good(s) and one for supporting boxes of non-assembled versions of the wheeled goods.

In one embodiment, the platform is additionally configured to selectively store unused portions of the retention assemblies, coupling members, related sign holders, and/or other fixture pieces during periods of non-use. In one example, the storage feature of the platform is generally visually undetectable during display of wheeled good display fixture including platform and cycle retention assemblies. Embodiments of the display fixture are further described below. Other embodiments and variations thereof are also contemplated and will be apparent to those of skill in the art upon reading the present application.

Figure 1:
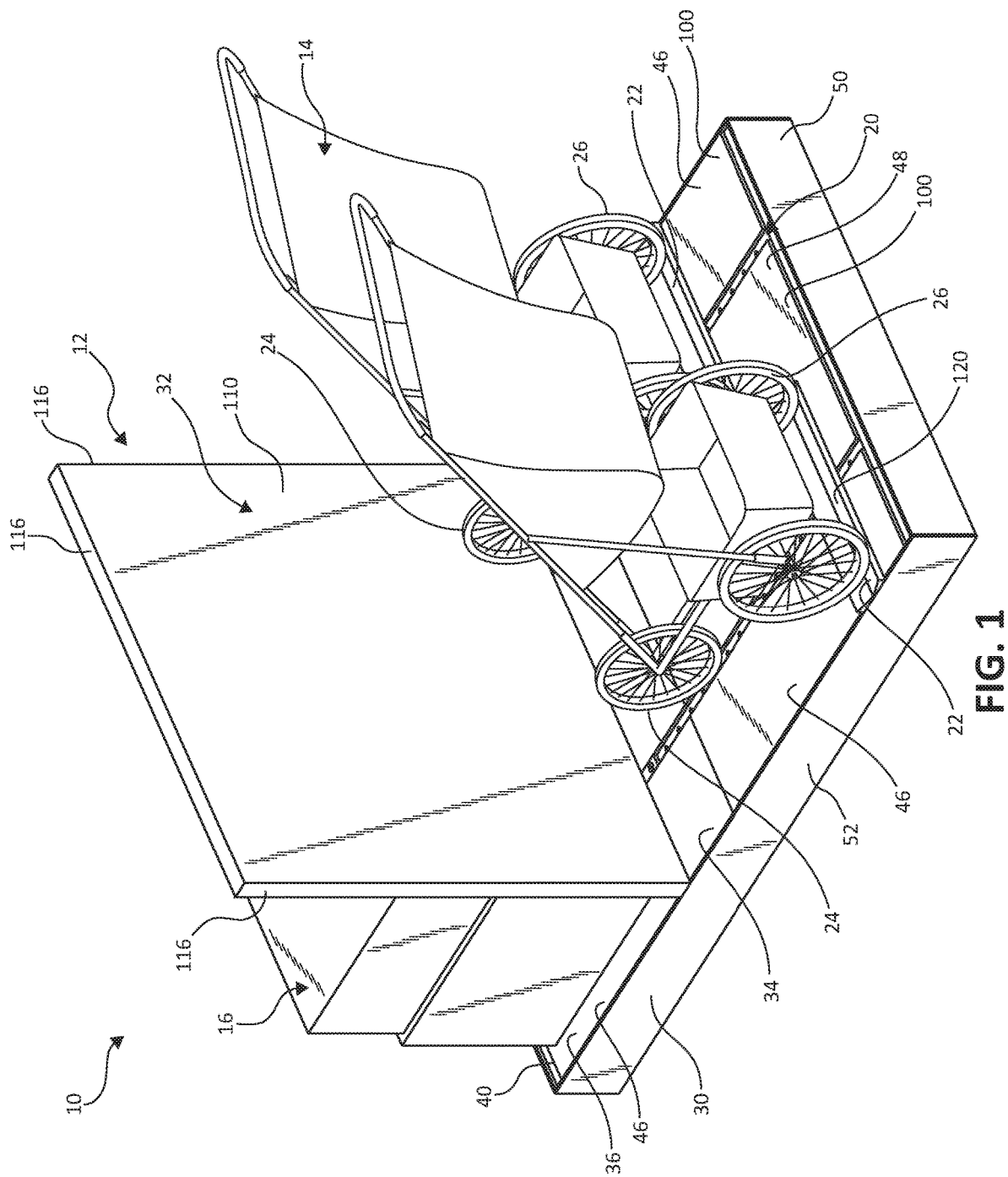
FIG. 1 is a perspective view illustration of a display fixture with a plurality of strollers stored thereon, according to one embodiment of the present invention.

Turning to the Figures, FIG. 1 illustrates a wheeled good display 10, according to one embodiment of the present invention. Wheeled good display 10, in one example, includes a platform fixture 12 supporting wheeled goods 14, such as such as strollers, wagons, tricycles, bicycles, carts, walkers, etc., and box goods 16. In one embodiment, wheeled good display 10 is a free-standing fixture designed to be placed on a supporting floor or other such surface. More specifically, platform fixture 12, which is shown with additional reference to FIGS. 2-7, is positioned on the supporting floor (not shown) or similar structure acting as a riser or other elevating base for display of wheeled goods 14 and/or box goods 16, for example, in a retail display to potential consumers or for other storage or display purposes.

In one example, platform fixture 12, more specifically, includes a securement track assembly 20 for selectively receiving a wheel stop 22. Wheeled good 14 may include one or more front wheels 24 and/or one or more rear wheels 26, with either one of the one or more front wheels 24 and one or more of the rear wheels 26 being placed within a corresponding wheel stop 22 to generally prevent front-to-back movement of wheeled good 14 on platform fixture 12.

Platform fixture 12 includes, in one embodiment, a platform 30 and one or more divider walls 32. Each divider wall 32 is securely coupled to and extends substantially vertically upwardly from a top of platform 30 to divide platform fixture 12 into at least a first side 34 and a second side 34. In one example, first side of platform fixture 12 supports wheeled good 14 which is substantially fully assembled to demonstrate how a product will look upon assembly and/or during use, while second side 36 supports boxed or otherwise packaged goods 16, which are available for purchase and each correspond to at least one of wheeled goods 14. In this manner, a potential consumer can review wheeled good 14 in an assembled form and, if they decide to purchase such a wheeled good 14, can take one of the boxed goods 16 for purchase.

In one example, wheeled good display fixture 10 supports each of the one or more wheeled good 14 in a substantially vertical position, that is to be positioned generally as each of the one or more wheeled goods 16 is orientated during use of such wheeled good 14. In this manner, a potential consumer is able to see each of the one or more wheeled good 14 in a position one would see the bicycle 16 during use. For example, each wheeled good 14 is placed so front wheels 24 and/or rear wheels 26 are placed on platform fixture 12.

Figure 8:
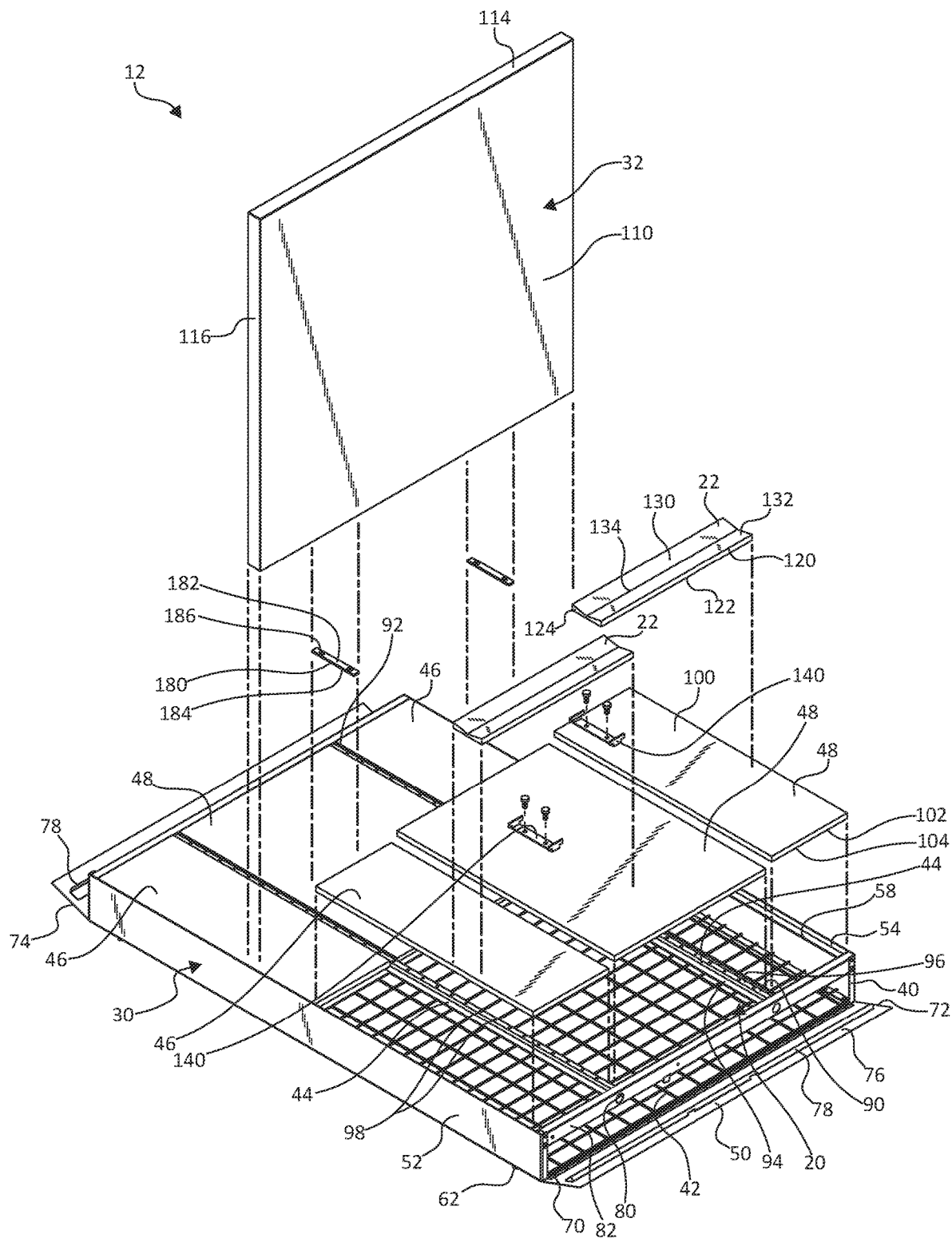
FIG. 8 is an exploded, perspective view illustration of the display fixture of FIG. 1, according to one embodiment of the present invention.

One example of platform fixture 12 is illustrated in more detail in the exploded view of FIG. 8, showing platform 30 partially exploded and divider wall 32 exploded upwardly away from platform 30. In one example, platform 30 includes a frame 40, bottom grid 42 (FIG. 4), top rails 44, and top deck panels 46 and 48, and wedge stop. Frame 40 forms the structural body of platform fixture 12, for instance, a rectangular box-like outer shape including two lateral walls 50 opposite one another and two longitudinal walls 52 opposite one another and each extending between ends of the two lateral walls 50. Lateral walls 50 and longitudinal walls 52 collectively define a perimeter top edge 54 of platform frame 40 and bottom edges 60 opposite perimeter top edges 54. In one example, a ledge 56 or 58 protrudes inwardly from an inside of each longitudinal wall 52 just below perimeter top edge 54. Each ledge 56 or 58 is secured to and protrudes inwardly from an inside surface of one of longitudinal wall 52 just below a portion of perimeter top edge 54 formed by the respective longitudinal wall 52.

Bottom grid 42 covers a substantially entirety of a bottom of a cavity formed within platform 30, and is securely coupled to each of bottom edges 60 according to one embodiment. In one example, bottom grid 42 contacts a lower supporting surface (not shown) while in other examples, adjustable or other feet or risers 62 raise bottom grid 42 and platform 30, as a whole, just above the lower supporting surface. In one embodiment, one or more substantially solid bottom panels (not shown) are each substantially planar and formed of a substantially rigid material placed directly on or slightly above bottom grid 42 to provide a substantially solid surface as the bottom of the cavity within platform 30. In one example, any such bottom panels are sized and shaped to collectively, substantially entirely cover bottom grid 42 in a manner preventing items maintained in the cavity of platform 30 from falling through bottom grid 42 to the lower supporting surface (not shown) below platform 30. Bottom panels may simply lay on bottom grid 42 while in other embodiments, bottom panels 23 are selectively or permanently secured to frame 40 and/or bottom grid 42. In one embodiment, magnets are included on one or both of frame 40 and/or bottom grid 42 to selectively hold any such bottom panels and hold the same in place within the cavity formed within platform 30.

In one example, one or both of lateral walls 50 is configured to hingedly fold downwardly to open the respective side of frame 40, for instance, about a hinge 70, which couples each lateral wall 50 to a corresponding portion of bottom edge 60. In this manner, each of lateral wall 50 includes a first free end 72 and an opposing second free end 74, which are not directly secured to either of lateral walls 50. In one embodiment, a coupling flange 78 extends from an end of each lateral wall 50 toward a corresponding end of the other one of lateral walls 50. A magnet 80, such as a rare earth magnet, is applied near the top of each of coupling flanges 78. Each lateral wall 50 is configured to interact with one or more of magnets 80, for example, by having a magnet of its own and/or being formed of a magnet material such as steel, to selectively secure each lateral wall 50 in the closed position as illustrated in FIG. 1. In one embodiment, a support 82 extends between the two opposing longitudinal walls 52 and, in one instance, between opposing coupling ledges 56 and 58 to provide structural stability to platform 30 near perimeter top edge 54. As illustrated, ledge 78 is positioned to fit just over and/or rest on support 82 when each lateral wall 50 is closed.

When open lateral wall 50 is open, access is provided from the corresponding side of platform 30 to the interior cavity thereof formed inside platform 30, more specifically, formed between lateral walls 50 and longitudinal walls 52. In this manner, the cavity is readily usable to maintain fixture or other items inside platform 30 during periods of nonuse. For example, as illustrated, the cavity is optionally used to maintained one or more parts, accessories, signs, etc.

thereof not currently in use. In one embodiment, platform 30 is configured to store items therein in a manner substantially hidden from view when both lateral walls 50 are closed.

Top rails 44 extend between lateral walls 50 as shown in the illustrated embodiment or between and substantially parallel to longitudinal walls 52. Top rails 44 are elongated, for example, an angle or rectangular tubular member, having a first end 90, an opposite second end 92, a bottom surface 94, and a top surface 96 opposite bottom surface 94. According to one embodiment, one of first end 90 is supported by one of support 82, lateral walls 50, and/or ledge 76 thereof and second end 82 is supported by the other one of support 82, lateral walls 50 and/or ledge 76. In one example, top rails 44 are positioned such that top surface 96 thereof is place at or below a planar level with respect to perimeter top edge 54. Top surface 96, in one embodiment, includes a plurality of apertures 98, for example, a linear array of apertures 98 spaced along top rail 44 between first end 90 and second end 92. Top rails 44 are configured to selectively couple with wedges stop(s) 22 and/or divider wall 32 or mounting hardware thereof, as will be further described below.

Deck panels 46 and 48 are sized and shaped to cover the cavity formed inside platform 30 between top rails 44 and frame 40. More specifically, in one embodiment, deck panels 46 and 48 includes side deck panels 46 and intermediate deck panels 48 sized to extend between members of frame 40 adjacent one of longitudinal walls 52 and a first one of top rails 44 and between two of the two top rails 44, respectively. Each of deck panels 46 and 48 is substantially planar and rigid to form a top surface of platform 30, for example, formed of steel, aluminum, or other suitably formed metal sheet. In one example, each of deck panels 46 and 48 includes a top surface 100, which is substantially planar, and depending flanges 102 extending around and downwardly from a perimeter of top surface 100 to a bottom edge 104 thereof. Bottom edges 104 are at least partially set to rest on two or three of ledges 58 and any rail ledge 44 as will be apparent to those of skill in the art upon reading the present application. In one embodiment, one or more of deck panels 46 and 48 is secured to one or more of top rails 44, e.g., via a ledge, securement mechanism, or other suitable securement, while in one embodiment, deck panels 46 and 48 are not directly secured to either one of top rails 44, but rather is placed adjacent to one or two of top rails 44.

Figure 9:
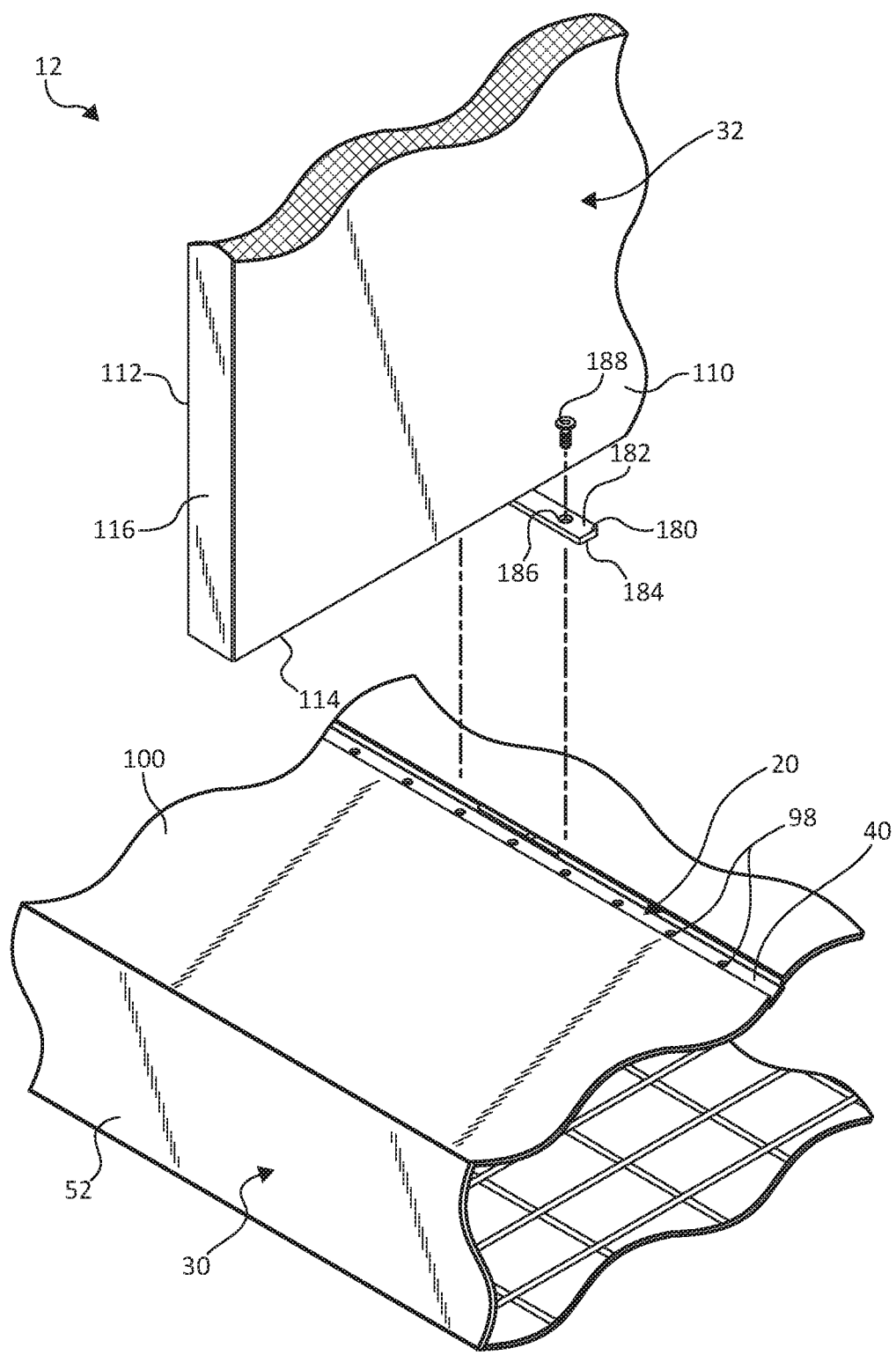
FIG. 9 is a perspective view illustration of the display fixture of FIG. 1, according to one embodiment of the present invention.
Figure 10:
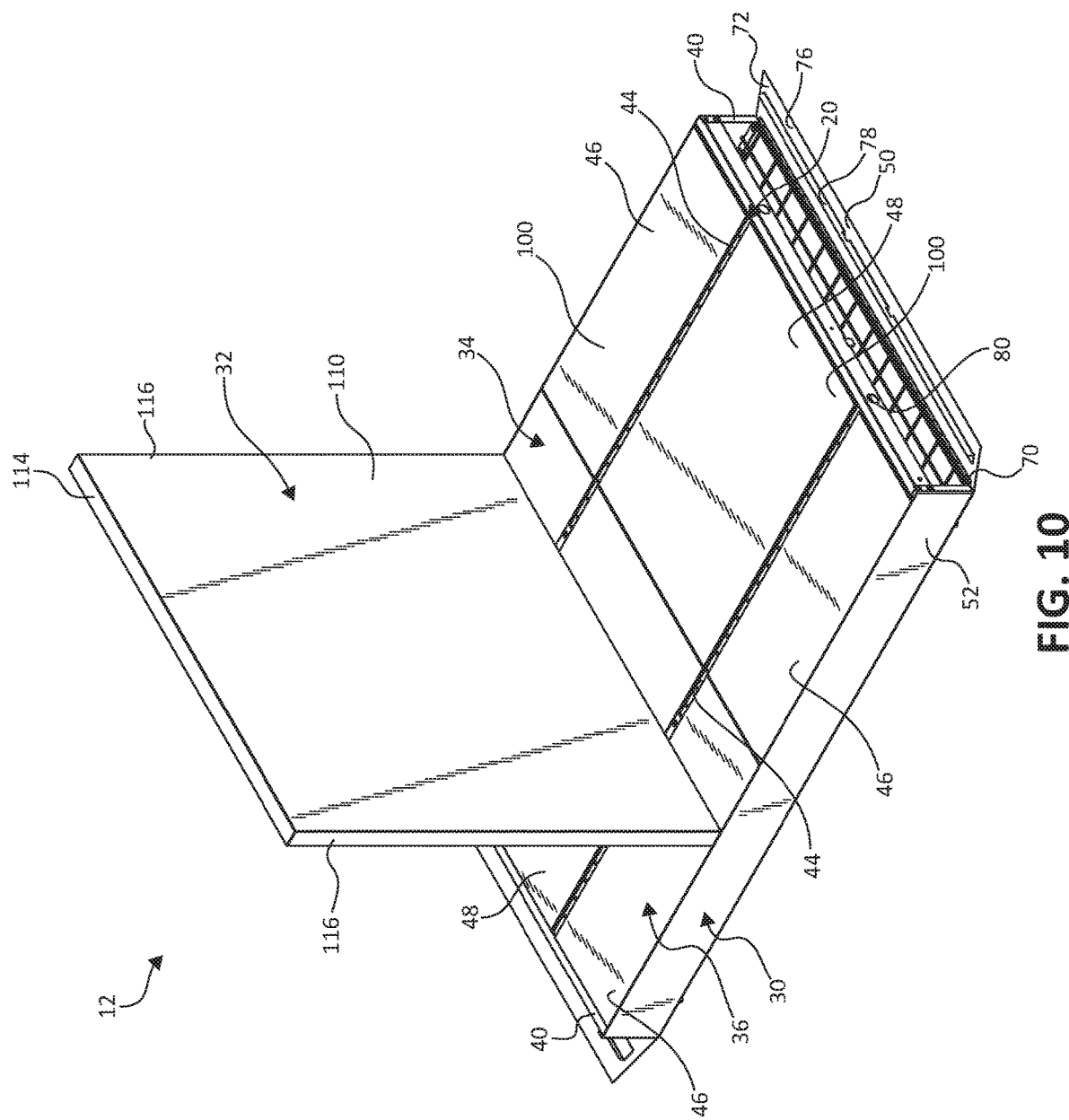
FIG. 10 is a bottom perspective view of the wedged wheel stop of the display fixture of FIG. 1, according to one embodiment of the present invention.

Divider wall 32 is formed in any suitable manner and, in one embodiment, dual sided rectangular member with fairy small thickness as compared to its width and height. As such, in one example, divider wall defines a first side 110, a second side 112, top and bottom edges 114 opposite one another, and side edges 116 opposite one another and each extending between top and bottom edges 114. Divider wall 32 is formed of any suitable one or more materials or a composite of materials including one or more of steel, aluminum, plastic, etc. In one embodiment, divider wall 32 is formed with a width substantially identical to a width of platform 30 and a height at least five times a height of platform 30. As illustrated with reference to FIGS. 8 and 9, in one embodiment, a bracket 180 extends transversely across and bottom edge 114 of divider wall to extend past each of first side 110 and second side 112, for instance, as a substantially planar member having a top surface 182 and an opposite bottom surface 184 substantially parallel with one another. At least one aperture 186 extends entirely through bracket 180 on each side of divider wall with a spacing substantially equal to the spacing between two of apertures 98 in each of top rails 44. In one example, there is a bracket 180 for coupling divider wall to platform at each of the plurality of top rails 44. Bracket 180 is coupled to divider wall in any suitable manner, such as welding, bolting, riveting, screwing, etc., as will be apparent to those of skill in the art upon reading the present application.

Each wedge stop 22 is configured to receive either front wheel(s) 24 or rear wheel(s) 26, for example, two rear wheels 26, to support wheeled good 14 on platform 30 of platform fixture 12, for example, in the manners described in additional detail below. In this manner, wedge stop 22 is configured to be selectively secured to a top of platform 30, as illustrated in FIG. 8 with additional references to the more detailed drawings of FIGS. 11 and 12. Referring to FIGS. 11 and 12, each wedge stop 22 defines a wedge shape top surface 120, e.g., elongated with a V-shaped cross-sectional shape and includes longitudinal 122, lateral flanges 124, and coupling flanges 126 configured to be selectively positioned on and secured along one or more of top rails 44 in a position depending on the size of and desired position of one or more of wheeled products 14 on first side 34 of divider wall.

More specifically, in one example, wedge stop 22 includes a first top panel 130 and a second top panel 132 of similar size that border or intersect each other along an intersecting line 134 and are each angled upwardly away from intersecting line 134 in an opposite direction, for example, in a substantially symmetrical manner about intersecting line 134. In this manner, first top panel 130 and second top panel 132 collectively define top surface 120 with a substantially V-shaped cross-sectional shape forming a V-shaped trough therebetween. Each of longitudinal flanges 122 extends downwardly from a top edge of one of first top panel 130 and second top panel 132 opposite intersecting line 134. In one example, each of longitudinal flanges 122 extend substantially parallel to one another, for instance, along a substantial entirety of a length of the corresponding, that is an immediately adjacent, one of longitudinal flanges 122. One of coupling flanges 126 extends from a bottom of each of longitudinal flanges 122 inwardly, that is, toward the other of the longitudinal flanges 122, a short distance for interacting with a mounting bracket 140. For instance, each coupling flange 126 includes a cutout 136 aligned longitudinally with the cutout 136 of the other one of each coupling flange 126 for receiving mounting bracket 140, as will be further described below. In one embodiment, lateral flanges 124 may also be included on wedge stop 22, for example, to cover opposing ends of first top panel 130, second top panel 132, and intersecting line 134 between opposing ends of longitudinal flanges 122.

Mounting bracket 140, according to one example and as illustrated in the FIG. 12, includes an elongated segment 142 and two opposing side segments 144. Elongated segment 142 is substantially planar, for example, flat bar shaped, having a top surface 150 and a bottom surface 152 opposite top surface. Top surface 150 and bottom surface 152 are substantially planar. Coupling apertures 154, for example, two coupling apertures 154 are formed through elongated segment spaced from each other a distance substantially identical to a distance array of apertures 98 of top rails 44 are spaced from each other. Each of the two side segments 144 extends upwardly from top surface 150, for example, in a T-shaped manner defining an offset or base portion 160 and cross bar 162 in one embodiment. Base portion 160 extends substantially perpendicularly relative to top surface 150 of elongated segment 142 with a width substantially similar to a width of base portion 160. Cross bar 162 is substantially coplanar with and centered relative to base portion 160, but with a width at least about 150% of a width of base portion 144, in one example.

In one embodiment, mounting bracket 140 is sized to have an overall length just slightly less than an inside width of wedge stop 22 between opposing longitudinal flanges 122, and elongated segment 142 to have an outside width substantially equal to or slightly smaller than a width of one of top rails 44. A width of base portion 144 is substantially equal to or less than a width of cutout 136; while cross bar 146 has a width greater than cutout 136, in one example.

Figure 2:
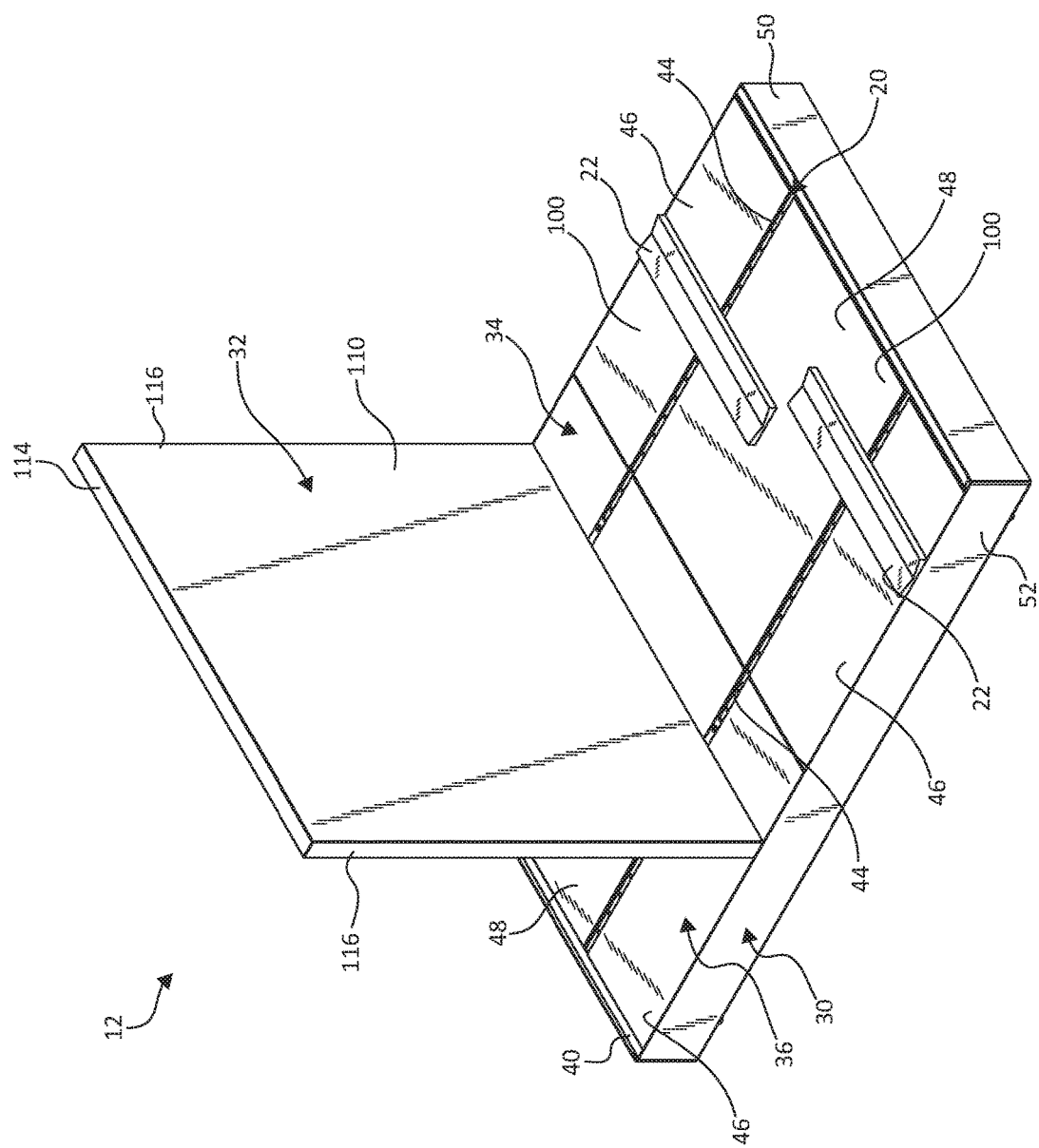
FIG. 2 is a perspective view illustration of the display fixture of FIG. 1, according to one embodiment of the present invention.
Figure 3:
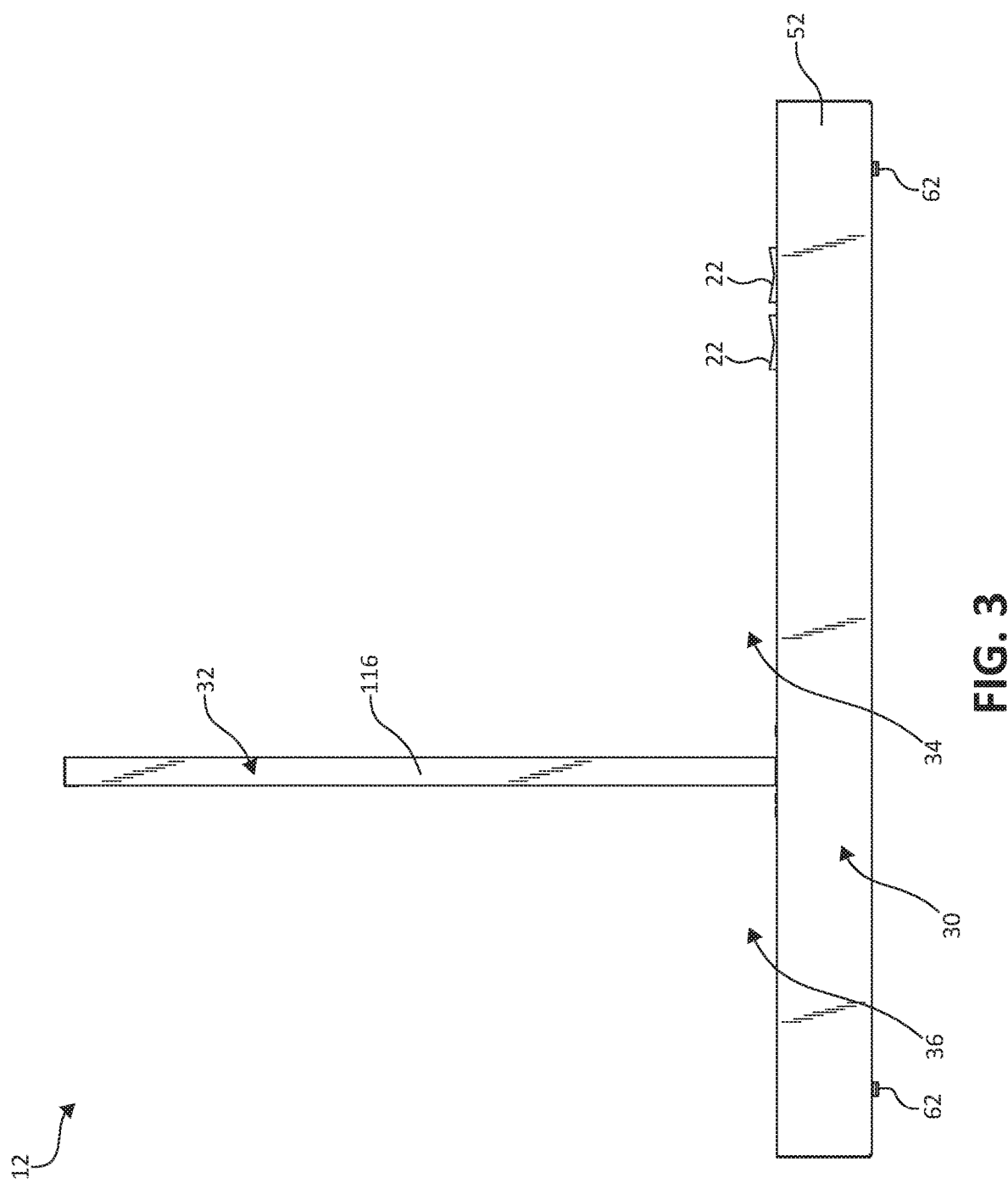
FIG. 3 is a front view illustration of the display fixture of FIG. 1, according to one embodiment of the present invention.
Figure 4:
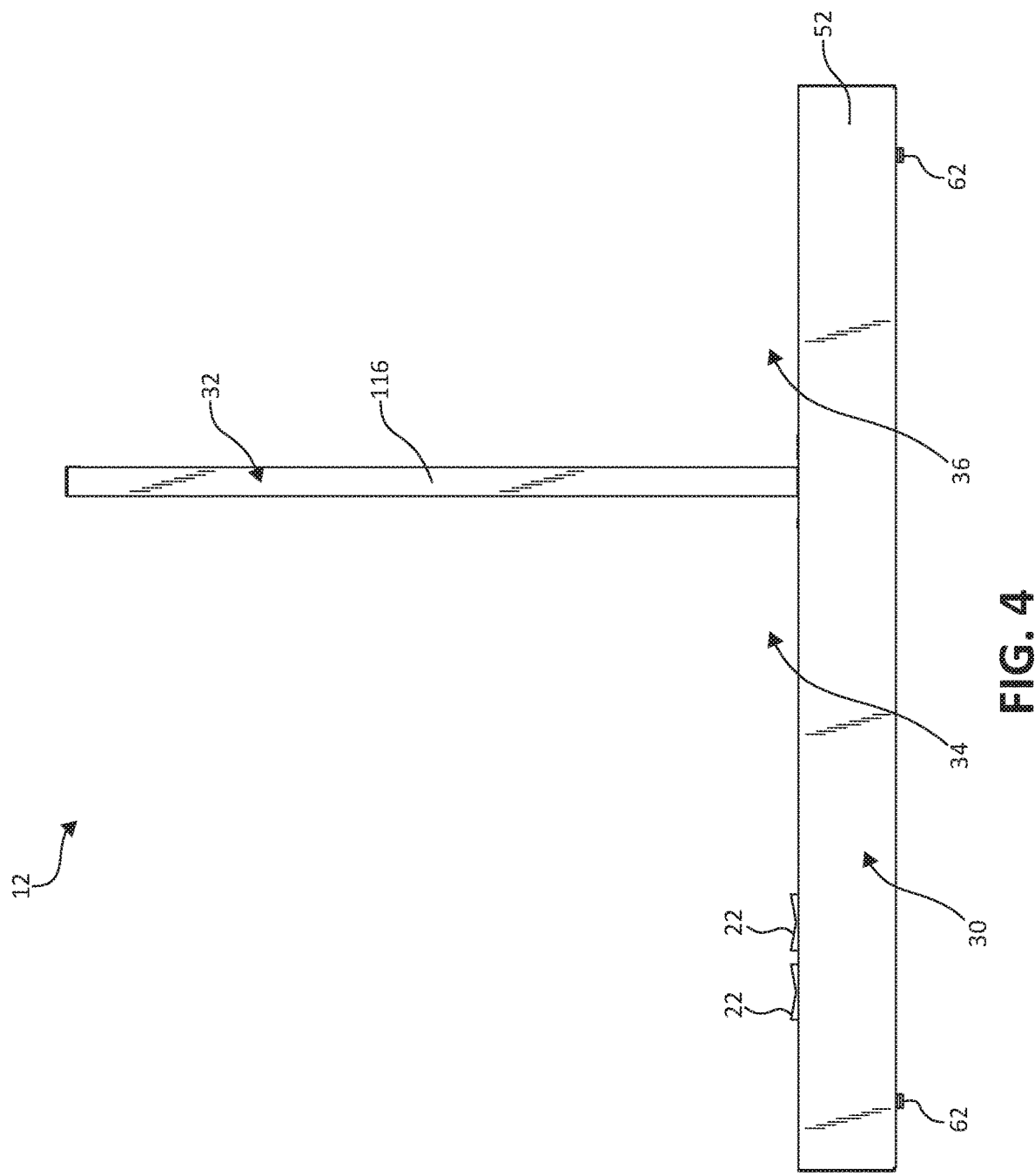
FIG. 4 is a rear view illustration of the display fixture of FIG. 1, according to one embodiment of the present invention.
Figure 5:
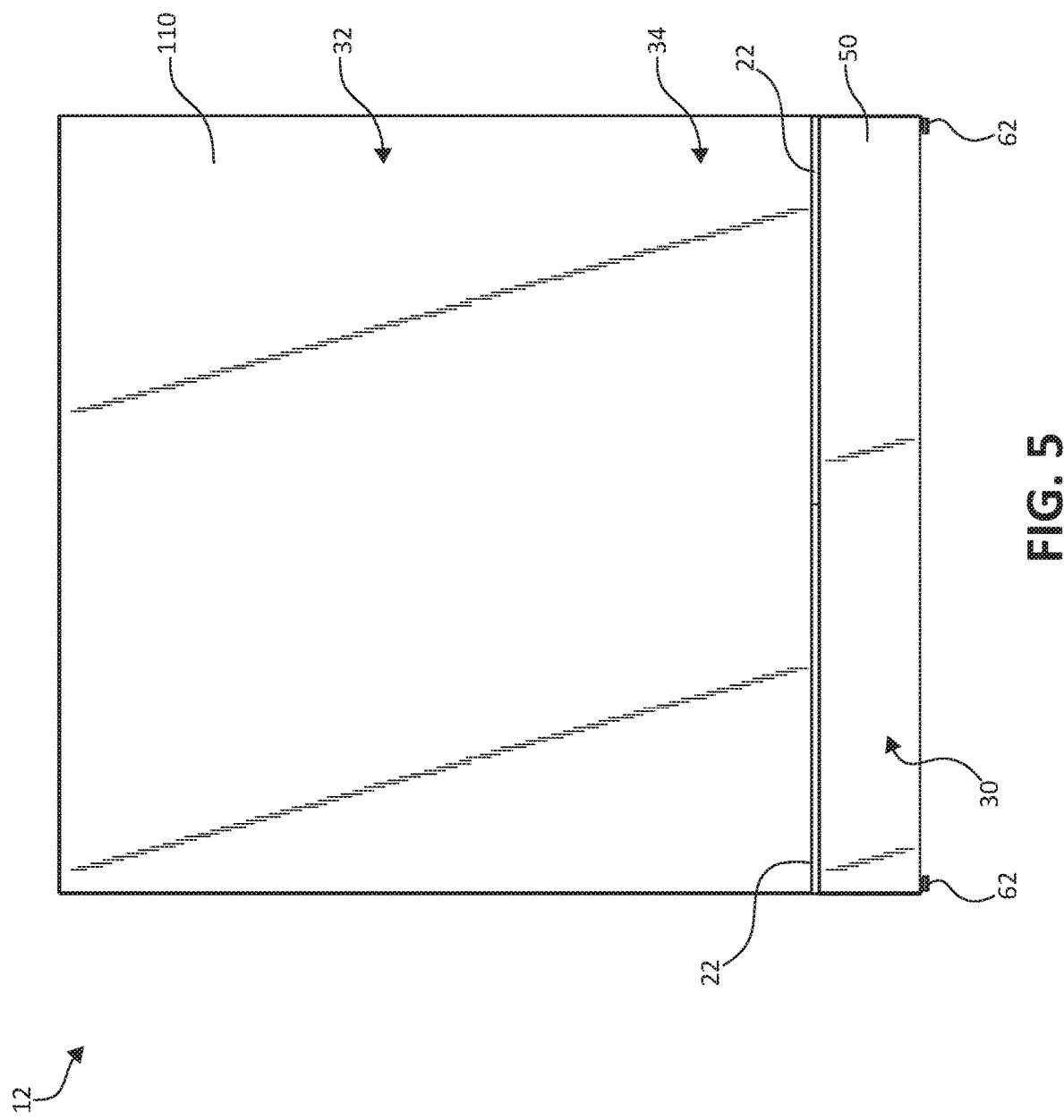
FIG. 5 is a right side view illustration of the display fixture of FIG. 1, according to one embodiment of the present invention.
Figure 6:
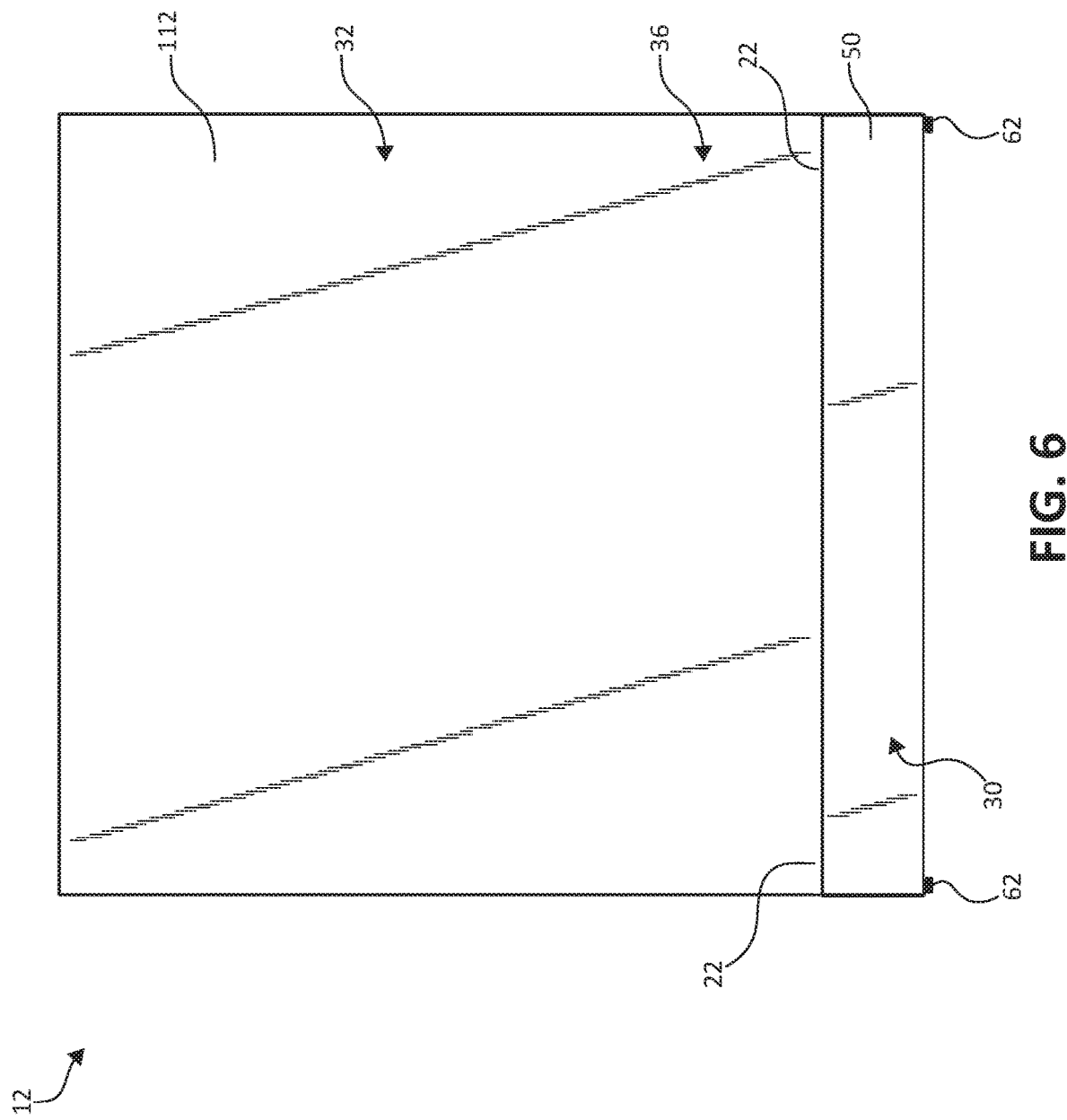
FIG. 6 is a left side view illustration of the display fixture of FIG. 1, according to one embodiment of the present invention.
Figure 7:
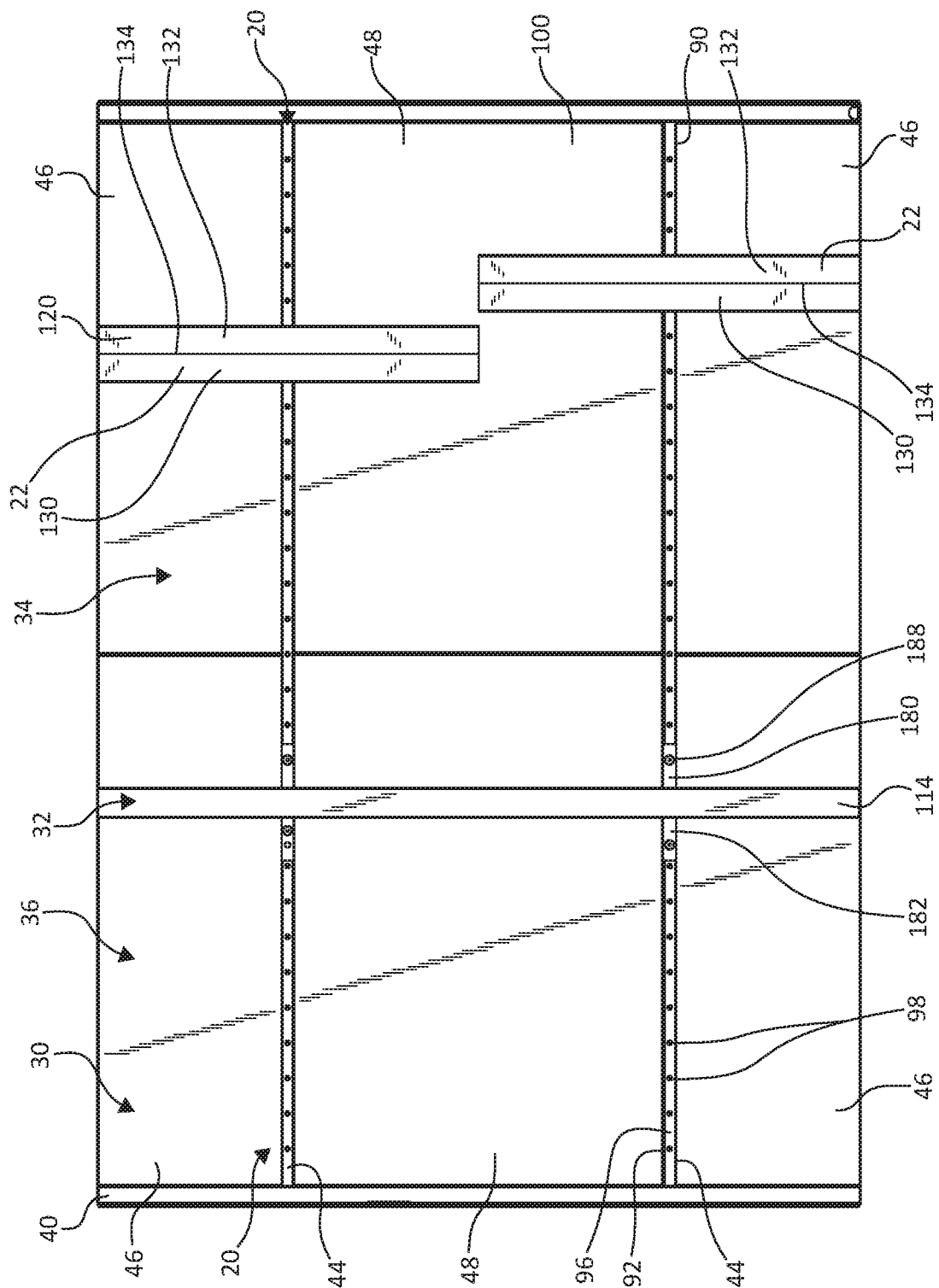
FIG. 7 is a top view illustration of the display fixture of FIG. 1, according to one embodiment of the present invention.

Referring primarily to FIG. 8, during use in a retail or other suitable setting, platform fixture 12 is positioned and assembled first. For example, frame 40 is placed in location with bottom grid 42, which, as described above, is already coupled to frame 40 or at least partially positioned within and coupled to frame 40. Deck panels 46 and 48 are then placed on top of frame 40 to cover to interior cavity, in one embodiment, as illustrated in FIGS. 1-3. For example, each of deck panels 46 and 48 are placed and then set on to portions of one or more of ledges 46 and 48. More specifically, bottom edge 104 of depending flanges 102 of each deck panel 46 and 48 is placed to rest on one or more of ledges 46 and 48. In one example, the height of each flange 102 is sized to allow a top surface of each deck panel 46 and 48 to fit substantially flush with top edge of lateral walls 50 and longitudinal walls 52 and/or above a top surface 96 of each of top rails 44.

Once platform 30 is assembled, divider wall 32 is secured thereto via brackets 180 each placed in a desired position along a different one of top rails 44. Brackets 180 are secured to top rails by screwing, bolting or otherwise inserting each securement member 188 through one of apertures 186 of bracket 180 and one of apertures 98 in one of top rails 44. In this manner, space above platform 30 is divided into a first side 34 and a second side 36.

Next, a desired position for wedge stop 22 is determined, for example, based on the size of wheeled good 14 and the desired position of wheeled good 14 on platform 30. Then, mounting bracket 140 is coupled to one of top rails 44 in a corresponding position. More specifically, in one embodiment, mounting bracket 140 is positioned in line with one of top rails 44 aligning apertures 154 of mounting bracket 140 with apertures 98 of top rail 44 as shown with additional reference to FIG. 8. A screw or bolt 170 or other securement member is placed through both one of apertures 154 and a corresponding one of apertures 98 to secure mounting bracket 140 to platform 30.

Once mounting bracket 140 is secured, wedge stop 22 is placed on platform 30 and secured in place via mounting bracket 140. More specifically, wedge stop 22 is angled or bent slightly to place each opposing base portion 160 to extend through a cutout 136 a corresponding different one of longitudinal flanges 122, and if bent or slightly stretched, wedge stop 22 is returned to its original dimensions. In this manner, interaction between base portion 160 of mounting bracket 140 and edges of the cutouts 136 defined by coupling flange 126 substantially prevent movement of wedge stop 22 in a side-to-side manner, that is in a direction parallel to longitudinal flanges 122. Interaction between side segments 144 and longitudinal flanges 122 substantially prevents movement in a direction substantially perpendicular to longitudinal flanges 122. In addition, interaction between cross bars 146 and top surfaces of coupling flange 126 substantially prevents movement of wedge stop 22 upwardly away from platform 30. It is noted, that the above described substantially prevented movement is during normal use of platform fixture 12, but said movement can be obtained when one is manipulating wedge stop 22 with an intention of removing wedge stop 22 from the platform 30. In this configuration, longitudinal flanges 122 and lateral flanges 124 substantially hide mounting bracket 140 from view, providing a clean aesthetic to platform fixture 12

The resulting platform fixture 12 provides a display for wheeled goods 14, such as strollers, etc., upright and in use. The platform fixture 12 is specifically configured be adjustable by moving divider wall 32 and/or one or more wedge stops 22 to maintain wheeled goods 14 of various lengths and to support each wheeled good 14 in a manner that is substantially visually unobtrusive to the overall look and feel and features of each of wheeled good 14. In one example, the platform fixture 12 also maintains the wheeled goods 14 above floor level placing each wheeled good 14 in a position more easily inspected by potential consumers. In one embodiment, the display fixture is even further functionable to act as hidden storage for fixture pieces, accessories, sign holders, etc. that are not currently in use for wheeled good display inside platform 30, more specifically in an interior cavity thereof accessible by opening hinged lateral walls 50. Lateral walls 50 are so configured to rotate about hinge 70 to open and back upwardly about hinge 70 to close platform ends. Magnets 80 on frame 40 selectively hold lateral wall 50 in a closed position hiding cavity from view and contributing to the clean aesthetic of platform fixture 12.

In one embodiment, fully assembled wheeled goods 14 are placed on first side 34 by placing at least one of front wheels 24 or rear wheels 26 in wedge stop as shown in FIG. 1. In one example, two wedge stops 22 are secured to a top of platform 30, each via a different top rail 44 such that two fully assembled wheeled goods 14 are placed on first side 34 and are generally prevented from rolling via wedge stop 22. This configuration leaves second side 36 open for displaying other items, for receiving additional wedge stops 22 and wheeled goods 14, or as illustrated, for receiving boxes 16 containing unassembled wheeled goods 14 for consumer purchase.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A platform fixture for displaying wheeled goods, the platform fixture comprising:
   a frame defining a shape of a platform configured to support the wheeled goods in a position elevated from a supporting floor;
   an elongated rail extending across a top of the frame;
   a wedge stop having a V-shaped top surface configured to selectively receive one or more wheels of one of the wheeled goods, the wedge stop including two longitudinal flanges and two coupling flanges, each of the two longitudinal flanges extending downwardly from an opposing side of the V-shaped top surface, each of the two coupling flanges extending from an edge of a different one of the two longitudinal flanges toward an opposite one of the other of the two longitudinal flanges; and
   a mounting bracket selectively coupled to the elongated rail and including two side segments spaced from each other and each being substantially T-shaped extending from the elongated rail with a base portion and terminating in a cross bar that is wider than the base portion;

wherein each of the two coupling flanges includes a cutout that is wider than the base portion of the mounting bracket and narrower than the cross bar of the mounting bracket, and the wedge stop is coupled to the mounting bracket by placing each base portion of the mounting bracket within the cutout of a different one of the two coupling flanges such that each cross bar is maintained between the different one of the coupling flanges and the V-shaped top surface to restrain vertical movement of the wedge stop from the elongated rail.

2. The platform fixture of claim 1, wherein the mounting bracket includes an elongated segment, and each of the two side segments extends upwardly from an opposite end of the elongated segment.

3. The platform fixture of claim 2, wherein the elongated segment includes coupling apertures extending therethrough, and the mounting bracket is selectively coupled to the elongated rail via the elongated segment.

4. The platform fixture of claim 3, wherein the elongated rail includes a linear array of rail apertures extending along a length thereof, and the mounting bracket is selectively coupled to the elongated rail via coupling members each extending through one of the coupling apertures and one of the rail apertures.

5. The platform fixture of claim 4, wherein each of the coupling apertures is spaced a distance substantially equal to a distance between two of the rail apertures of the linear array of rail apertures.

6. The platform fixture of claim 4, further comprising a divider wall extending vertically from the frame, the divider wall including a bracket selectively coupled with the elongated rail and coupling the divider wall to the frame via the elongated rail, wherein the bracket includes bracket apertures spaced apart a distance substantially equal to a first distance between two of the linear array of rail apertures, and the coupling apertures are spaced a second substantially equal distance between two different ones of the rail apertures, wherein the first distance is greater than the second distance.

7. The platform fixture of claim 6, wherein all of the apertures in the linear array of apertures is spaced away the second distance from the adjacent ones of the linear array of apertures.

8. The platform fixture of claim 1, wherein the wedge stop includes a first top panel and a second top panel bordering each other at an intersecting line, each of the first top panel and the second top panel angle upwardly away from the intersecting line to a different one of the two longitudinal flanges, the first top panel and the second top panel collectively defining the V-shaped top surface.

9. The platform fixture of claim 8, wherein each of the longitudinal flanges extends substantially parallel to the intersecting line.

10. The platform fixture of claim 1, further comprising:
sidewalls covering sides of the frame;
deck panels covering the top of the frame around the elongated rail;
wherein the sidewalls and the deck panels collectively define an interior cavity of the platform fixture.

11. The platform fixture of claim 10, wherein each of the sidewalls extends substantially parallel to the elongated rail.

12. The platform fixture of claim 10, wherein at least one of the sidewalls is hingedly coupled to a remainder of the platform fixture, such that the at least one of the sidewalls is configured to be rotated downwardly to provide selective access to the interior cavity.

13. The platform fixture of claim 12, wherein the frame includes a magnet, and the at least one of the sidewalls is selectively held in a closed position via magnetic coupling with the magnet on the frame.

14. The platform fixture of claim 10, wherein the top of the elongated rail is positioned to be substantially coplanar with top surfaces of the deck panels.

15. The platform fixture of claim 1, in combination with the wheeled good.

16. The platform fixture of claim 1, in combination with the wheeled good, wherein:
the wheeled good includes wheels,
at least one of the wheels are set at least partially within the wedge stop to interact with the V-shaped top surface such that the wedge stop limits rolling of the at least one of the wheels.

17. The platform fixture of claim 1, further comprising a divider wall extending vertically from the frame, the divider wall including a bracket selectively coupled with the elongated rail and coupling the divider wall to the frame via the elongated rail.

18. The platform fixture of claim 1, wherein the mounting bracket includes two lateral flanges extending from opposing ends of the V-shaped top surface between the two longitudinal flanges, such that the mounting bracket is hidden from view via the wedge stop.

19. A wheeled good display comprising:
a wheeled good having two or more wheels;
a platform fixture configured to support the wheeled good above a support surface, the platform fixture including:
sidewalls defining a cavity therebetween;
an elongated rail extending across a top of the cavity;
a wedge stop having a V-shaped top surface configured to selectively receive one or more of the two or more wheels of the wheeled good, the wedge stop including two longitudinal flanges and two coupling flanges, each of the two longitudinal flanges extending downwardly from an opposing side of the V-shaped top surface, each of the two coupling flanges extending from an edge of a different one of the two longitudinal flanges toward an opposite one of the other of the two longitudinal flanges; and
a mounting bracket selectively coupled to the elongated rail and including two side segments spaced from each other and each being substantially T-shaped extending from the elongated rail with a base portion and terminating in a cross bar that is wider than the base portion;
wherein each of the two coupling flanges includes a cutout that is wider than the base portion of the mounting bracket and narrower than the cross bar of the mounting bracket, and the wedge stop is coupled to the mounting bracket by placing each base portion of the mounting bracket within the cutout of a different one of the two coupling flanges such that each cross-bar is maintained between the different one of the coupling flanges and the V-shaped top surface to restrain vertical movement of the wedge stop from the elongated rail.

20. The wheeled good display of claim 19, wherein the wedge stop includes a first top panel and a second top panel bordering each other at an intersecting line, each of the first top panel and the second top panel angle upwardly away from the intersecting line to a different one of the two longitudinal flanges, the first top panel and the second top panel collectively defining the V-shaped top surface, and the V-shaped top surface is sized to receive two wheels of the at least two wheels of the wheeled good.

\* \* \* \* \*